US007404610B2

(12) United States Patent
Smith et al.

(10) Patent No.: US 7,404,610 B2
(45) Date of Patent: Jul. 29, 2008

(54) BEZEL RELEASE MECHANISM

(75) Inventors: Peter A. Smith, Cary, NC (US); Susan P. Wise, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/912,713

(22) Filed: Aug. 5, 2004

(65) Prior Publication Data

US 2006/0028103 A1    Feb. 9, 2006

(51) Int. Cl.
*H05K 7/18* (2006.01)
(52) U.S. Cl. .................................. 312/223.2
(58) Field of Classification Search ............. 312/223.2, 312/265.5, 265.6; 361/683, 679; 292/175, 292/80, 87, 19; 174/520, 559, 560, 561, 174/562
See application file for complete search history.

(56) References Cited

U.S. PATENT DOCUMENTS

| | | | |
|---|---|---|---|
| 5,740,012 A | 4/1998 | Choi | 361/686 |
| 5,790,278 A | 8/1998 | Ehrne et al. | 358/496 |
| 5,967,633 A | 10/1999 | Jung | 312/223.2 |
| 5,997,115 A * | 12/1999 | Radloff et al. | 312/223.2 |
| 6,049,452 A | 4/2000 | You et al. | 361/685 |
| 6,062,663 A | 5/2000 | You et al. | 312/223.2 |
| 6,141,209 A | 10/2000 | Kerrigan et al. | 361/683 |
| 6,209,975 B1 * | 4/2001 | Lai | 312/265.6 |
| 6,246,572 B1 | 6/2001 | Myers et al. | 361/683 |
| 6,296,333 B1 * | 10/2001 | Lee et al. | 312/223.2 |
| 6,297,948 B1 | 10/2001 | Buican et al. | 361/683 |
| 6,356,436 B1 | 3/2002 | Buican et al. | 361/683 |
| 6,373,690 B1 | 4/2002 | Buican et al. | 361/683 |
| 6,637,847 B2 * | 10/2003 | Crisp et al. | 312/223.2 |
| 6,899,407 B1 * | 5/2005 | Lai | 312/265.6 |

* cited by examiner

*Primary Examiner*—Janet M. Wilkens
(74) *Attorney, Agent, or Firm*—Sawyer Law Group LLP

(57) ABSTRACT

An improved bezel release mechanism for a computer includes wedges, which move laterally over clips on the bezel and apply a downward force on clips when a button coupled to the wedges is pushed. The downward force releases the clips from features on the chassis, disengaging the bezel. In this manner, the bezel release mechanism is toolless and allow for the efficient removal and recoupling of the bezel. Since the bezel release mechanism resides within the chassis and requires the removal of a side door to access it, it also provides protection against accidental or malicious operation.

10 Claims, 7 Drawing Sheets

BEZEL RELEASE MECHANISM

FIELD OF THE INVENTION

The present invention relates to the removal of the bezel from computers, and more particularly to the toolless removal of the bezel.

BACKGROUND OF THE INVENTION

The removal of the bezel, or front plate, from the chassis of a computer is usually required for the replacement or installation of floppy, CD, DVD, or tape drives, as well as other hardware. Typically a tool, such as a screwdriver, is needed to remove screws or other mechanisms that couple the bezel to the chassis. However, the need to use a tool to remove the coupling mechanism takes time and negatively impacts the efficiency in the replacement or installation. Some existing methods are difficult or counterintuitive or take up excessive space. In addition, most coupling mechanisms reside outside of the chassis, exposing them to accidental or malicious operation.

Accordingly, there exists a need for an improved bezel release mechanism for a computer. The bezel release mechanism should be toolless and allow for the efficient removal and recoupling of the bezel. It should also protect against accidental or malicious operation. The present invention addresses such a need.

SUMMARY OF THE INVENTION

An improved bezel release mechanism for a computer includes wedges, which move laterally over clips on the bezel and apply a downward force on clips when a button coupled to the wedges is pushed. The downward force releases the clips from features on the chassis, disengaging the bezel. In this manner, the bezel release mechanism is toolless and allows for the efficient removal and recoupling of the bezel. Since the bezel release mechanism resides within the chassis and requires the removal of a side door to access it, it also provides protection against accidental or malicious operation.

DETAILED DESCRIPTION

The present invention provides an improved bezel release mechanism for a computer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 7 in conjunction with the discussion below.

Figure 1:
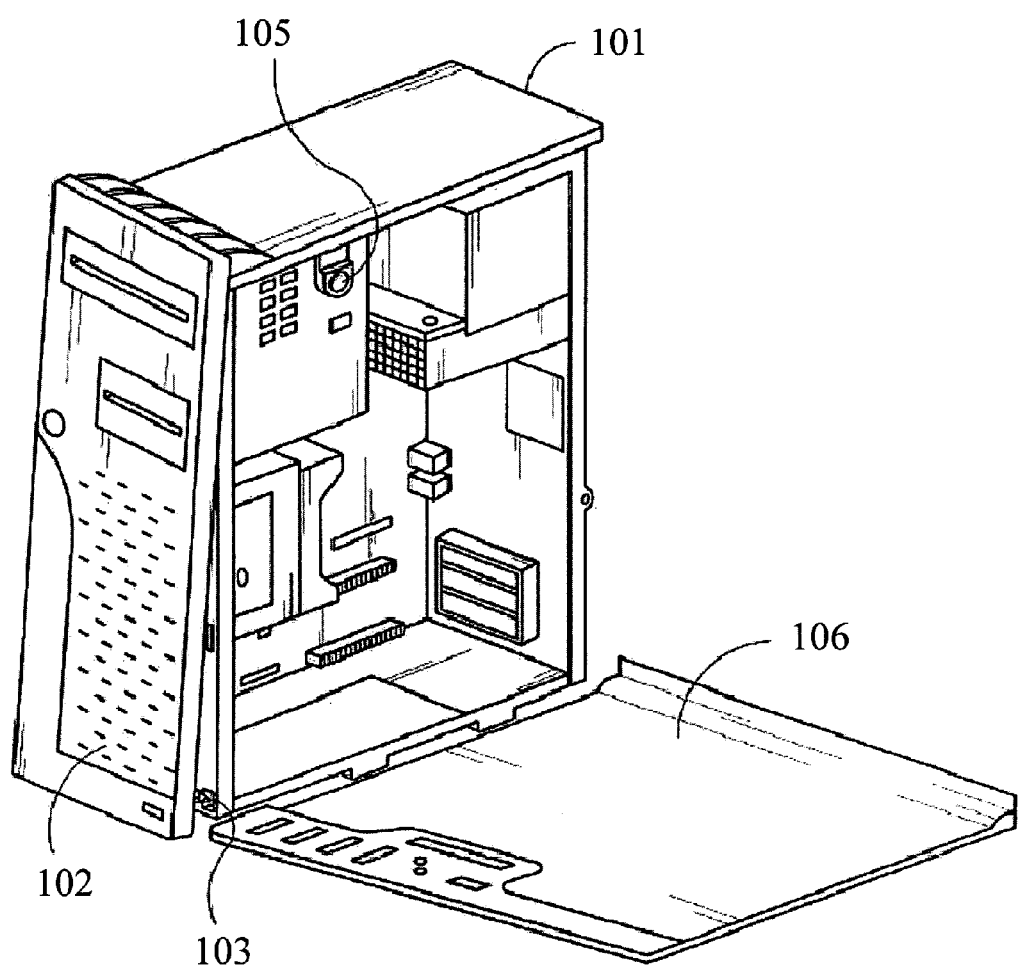
FIGS. 1 and 2 illustrate a preferred embodiment of a computer with a bezel release mechanism in accordance with the present invention.
Figure 2:
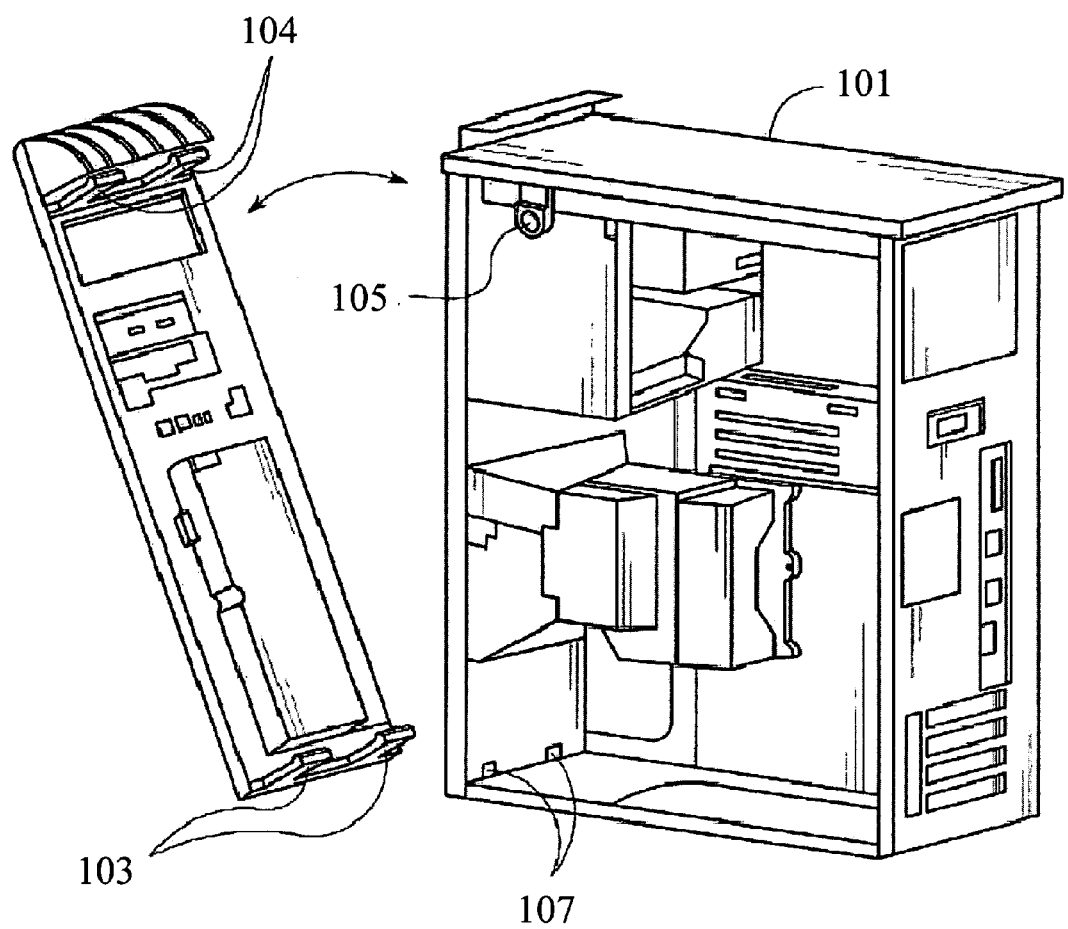
Figure 3:
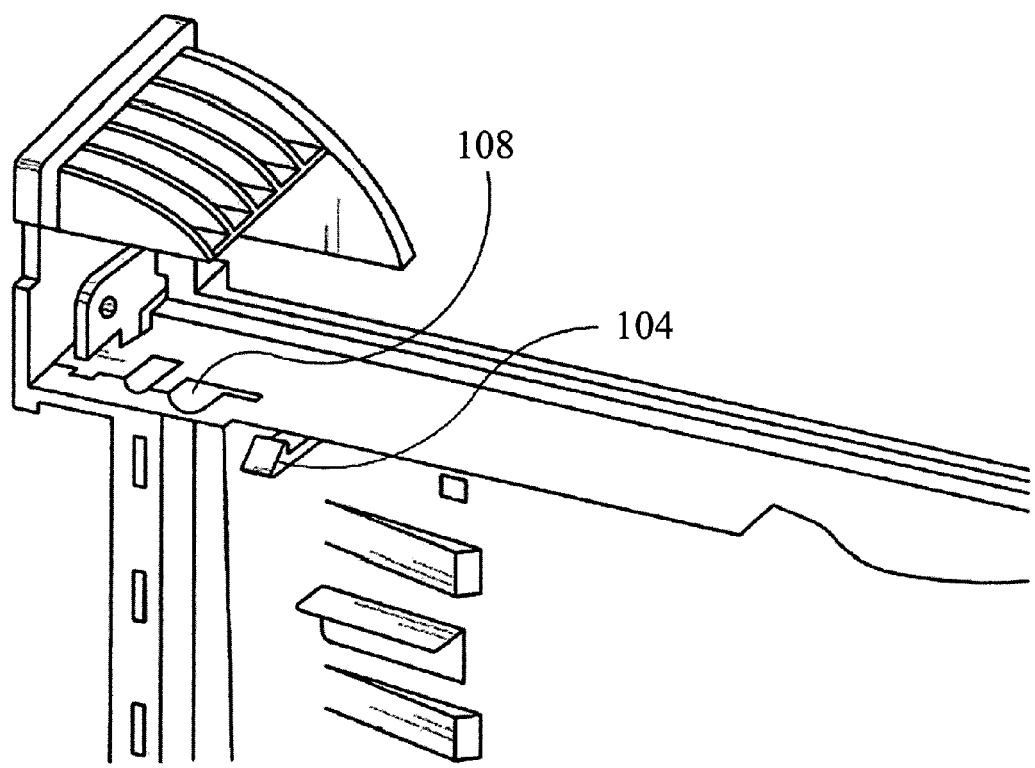
FIGS. 3 and 4 illustrate in more detail the clips of the bezel when coupled to the chassis in accordance with the present invention.
Figure 4:
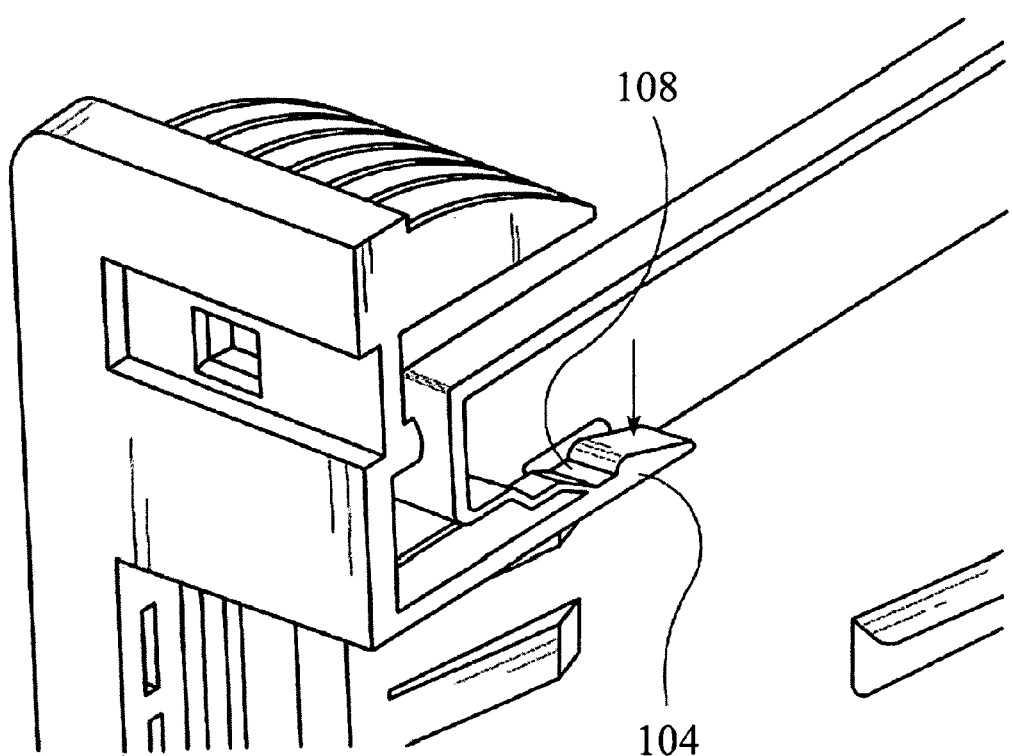

FIGS. 1 and 2 illustrate a preferred embodiment of computer with a bezel release mechanism in accordance with the present invention. The computer, as illustrated in FIGS. 1 and 2, includes a chassis 101 and a bezel 102 to which it can be coupled. The bezel 102 includes bottom hooks 103 (see FIG. 2) and a plurality of clips 104. To couple the bezel 102 to the chassis 101, the bottom hooks 103 engage hook openings 107 in the chassis 101 and the clips 104 engage chassis features (or notches in the chassis 101 as shown in FIG. 3). FIGS. 3 and 4 illustrate in more detail the clips 104 of the bezel 102 when coupled to the chassis 101. When the bezel 102 is coupled to the chassis 101, the clips 104 abut the chassis features 108 as illustrated, such that a downward force on the clips 104 will release it from the chassis features 108.

The pushing of a button 105 (FIG. 5) disengages or releases the clips 104 of the bezel 102 from the chassis 101 without the use of tools. The chassis 101 further includes a removable side door 106 (FIG. 1). When the side door 106 is coupled to the rest of the chassis 101, the button 105 resides within the chassis 101.

Figure 5:
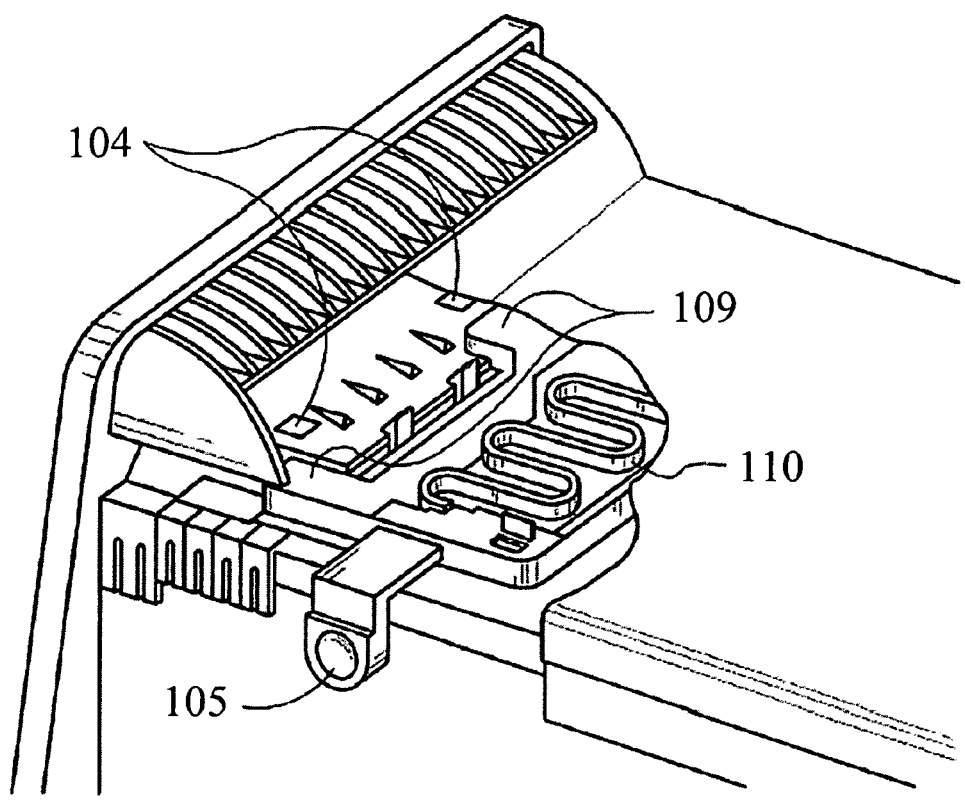
FIGS. 5–7 illustrate in more detail the bezel release mechanism in accordance with the present invention.
Figure 6:
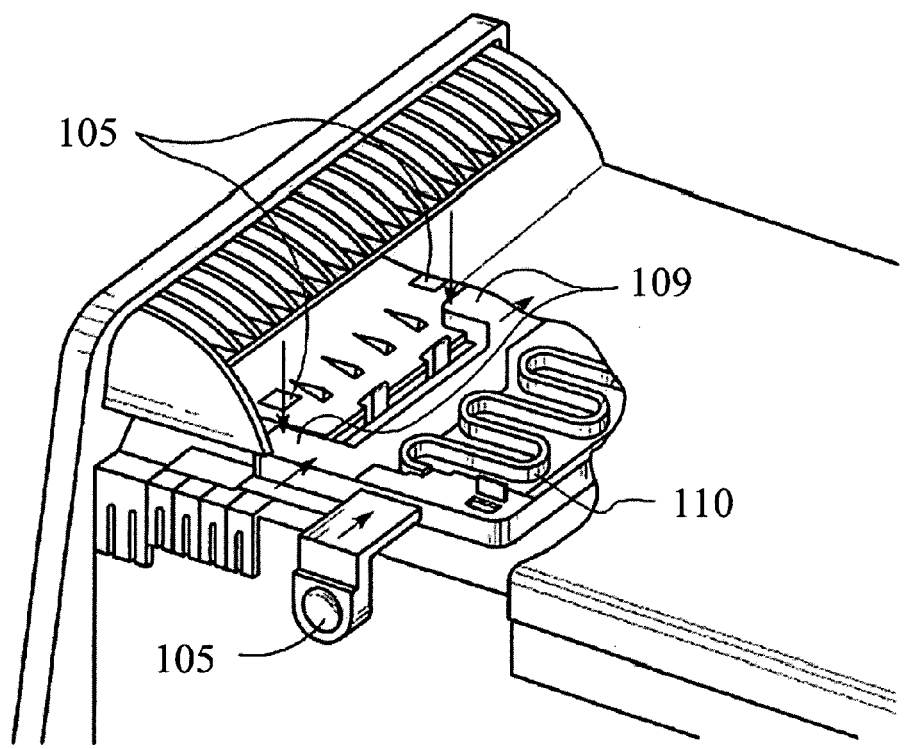
Figure 7:
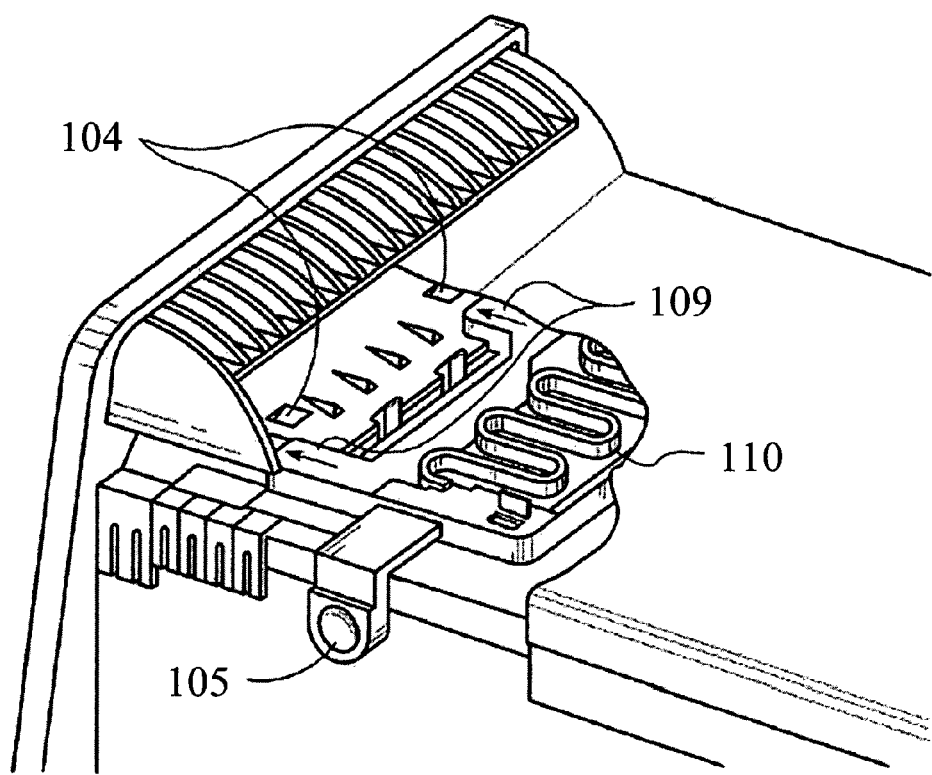

FIGS. 5 through 7 illustrate in more detail the bezel release mechanism in accordance with the present invention. As illustrated in FIG. 5, the bezel release mechanism includes the button 105, a spring 110 coupled to the button 105, and a plurality of wedges 109 coupled to the button 105 and proximate to the clips 104, all residing within the chassis 101. When the bezel 102 is coupled to the chassis 101, the button 105 is in the "out" or rest position. The clips 104 abut the chassis feature 108 (as illustrated in FIGS. 3 and 4), and the spring 110 is uncompressed or relaxed. The wedges 109 are proximate to the clips 104 but not touching them.

As illustrated in FIG. 6, when the button 105 is partially depressed, the wedges 109 move laterally toward the clips 104 and begins to apply a downward force upon them. In the preferred embodiment, the button 105, spring 110, and wedges 109 are fixed rigidly together so that when the button 105 moves, the spring 110 and wedges 109 move as well.

As illustrated in FIG. 7, when the button 105 is fully depressed, the wedges 109 further apply the downward force to the clips 104, such that the clips 104 are released from the chassis features 108, disengaging the bezel 102 from the chassis 101. When the button 105 is fully depressed, the spring 110 is also compressed. Once the button 105 is released, the spring 110 decompresses, returning the button 105 to its rest position. Thus, here, the sole purpose of the spring 110 is to return the button 105 to its rest position when released.

Returning to FIG. 2, to re-engage the bezel 102 to the chassis 101, the bottom hooks 103 on the bezel 102 engage the hook openings 107 in the chassis 101. The bezel 102 then swings until the clips 104 fully engage the chassis 101 again.

An improved bezel release mechanism for a computer has been disclosed. The bezel release mechanism includes wedges, which move laterally over clips on the bezel and apply a downward force on the clips when a button coupled to the wedges is pushed. The downward force releases the clips from features on the chassis, disengaging the bezel. In this manner, the bezel release mechanism is toolless and allows for the efficient removal and recoupling of the bezel. Since the bezel release mechanism resides within the chassis and requires the removal of a side door to access it, it also provides protection against accidental or malicious operation.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A bezel release mechanism in a computer having a chassis, the bezel release mechanism comprising:
   a wedge residing within the chassis of the computer; and
   a button coupled to the wedge,
   wherein when the button is depressed, the wedge moves laterally to a position above a clip of a bezel coupled to the chassis and the wedge applies a downward force on the clip to disengage the bezel from the chassis.

2. The bezel release mechanism of claim 1, further comprising:
   a spring coupled to the button, wherein the spring compresses when the button is depressed, and the spring decompresses when the button is released.

3. The bezel release mechanism of claim 1, wherein:
   the chassis further comprises a side door; and
   access to the button requires removal of the side door.

4. The bezel release mechanism of claim 1, wherein the chassis supports one or more of a floppy drive, a CD drive, a DVD drive, or tape drive within the computer.

5. A computer system comprising:
   a chassis comprising a notch therein;
   a bezel comprising a clip that engages the notch when the bezel is coupled to the chassis;
   a wedge residing within the chassis; and
   a button coupled to the wedge,
   wherein when the button is depressed, the wedge moves laterally to a position above the clip and applies a downward force on the clip to disengage the clip from the notch.

6. The computer system of claim 5, further comprising:
   a spring coupled to the button, wherein the spring compresses when the button is depressed, and the spring decompresses when the button is released.

7. The computer system of claim 5, wherein the clip resides proximate to a top end of the bezel.

8. The computer system of claim 5, wherein:
   the bezel further comprises a hook proximate to a bottom end of the bezel; and
   the chassis further comprising a hook opening, wherein the hook proximate to the bottom end of the bezel engages the hook opening on the chassis when the bezel is coupled to the chassis.

9. The computer system of claim 5, wherein the chassis further comprises:
   a side door that requires removal for access to the button.

10. The computer system of claim 5, wherein the chassis supports one or more of a floppy drive, a CD drive, a DVD drive, or tape drive within the computer.

* * * * *